(12) United States Patent
Ince et al.

(10) Patent No.: US 9,702,415 B1
(45) Date of Patent: Jul. 11, 2017

(54) WEDGE CLUTCH WITH MUTUALLY SUPPORTING WEDGE PLATES AND SELF-LOCKING DISPLACEMENT ASSEMBLY

(71) Applicant: Schaeffler Technologies AG & Co. KG, Herzogenaurach (DE)

(72) Inventors: Marion Jack Ince, Mount Holly, NC (US); Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/049,931

(22) Filed: Feb. 22, 2016

(51) Int. Cl.
*F16D 15/00* (2006.01)
*F16D 23/14* (2006.01)
*F16D 13/16* (2006.01)
*F16D 23/12* (2006.01)

(52) U.S. Cl.
CPC ............. *F16D 15/00* (2013.01); *F16D 13/16* (2013.01); *F16D 23/14* (2013.01); *F16D 2023/123* (2013.01)

(58) Field of Classification Search
USPC .......................................................... 192/78
See application file for complete search history.

(56) References Cited

U.S. PATENT DOCUMENTS

| | | | | |
|---|---|---|---|---|
| 1,014,865 A | * | 1/1912 | Cook | F16D 13/12 192/78 |
| 1,115,928 A | * | 11/1914 | Hansen | F16D 13/12 192/107 R |
| 1,872,690 A | * | 8/1932 | Dodge | F16D 13/18 192/13 R |
| 2,569,573 A | * | 10/1951 | Owens | B41B 11/00 192/114 R |
| 2,782,893 A | * | 2/1957 | Chapman | F16D 13/16 192/105 CE |
| 2014/0110207 A1 | | 4/2014 | Davis | |
| 2015/0083539 A1 | | 3/2015 | Lee et al. | |

* cited by examiner

*Primary Examiner* — Mark Manley
(74) *Attorney, Agent, or Firm* — Chester Paul Maliszewski (57) ABSTRACT

A wedge clutch, including: a hub; an outer ring; a wedge plate between the hub and the outer ring; and a displacement assembly including a locking ring including a first axial stop, an engagement arm, a first resilient element urging the distal end in a first rotational direction. The slider ring is axially displaceable to: rotate the engagement arm in a second rotational direction to transition from a connect mode, in which the hub and the outer ring are non-rotatably connected, to a disconnect mode, in which the hub and the outer ring are rotatable with respect to each other; and for the connect mode, enable the first resilient element to rotate the engagement arm in the first rotational direction to contact the first axial stop to block displacement of the hub, with respect to the wedge plate, in the first axial direction.

20 Claims, 9 Drawing Sheets

WEDGE CLUTCH WITH MUTUALLY SUPPORTING WEDGE PLATES AND SELF-LOCKING DISPLACEMENT ASSEMBLY

TECHNICAL FIELD

Described herein is a wedge clutch with a self-locking displacement assembly. In particular, the assembly is able to maintain the wedge clutch in a connect (closed) mode without the application of external force, for example by an actuator.

BACKGROUND

During a connect (closed) mode for known wedge clutches having a hub with a radially sloping surface for contacting the wedge plate, compressive forces, due to the transmission of torque through the clutch, urge the wedge plate to slip down the radially sloping surface, which tends to axially displace the hub with respect to the wedge plate and open the clutch, reducing reliability and torque-carrying capacity of the wedge clutch. An actuator can be used to apply axial force to the hub to maintain the axial position of the hub. However, the actuator must be powered by the vehicle in which the wedge clutch is located, which reduces the amount of power available for other components in the vehicle and the overall efficiency of the wedge clutch and vehicle.

SUMMARY

According to aspects illustrated herein, there is provided a wedge clutch, including: an axis of rotation; a hub; an outer ring located radially outward of the hub; a wedge plate radially disposed between the hub and the outer ring; and a displacement assembly including a first element urging the hub in a first axial direction, a locking ring including a first axial stop, an engagement arm, a first resilient element urging the engagement arm in a first rotational direction, with respect to a first axis passing through the engagement arm, toward the axis of rotation and a slider ring. The slider ring is axially displaceable to: rotate the engagement arm in a second rotational direction, opposite the first rotational direction, to transition from a connect mode for the wedge clutch, in which the hub and the outer ring are non-rotatably connected, to a disconnect mode for the wedge clutch, in which the hub and the outer ring are rotatable with respect to each other; and for the connect mode, enable the first resilient element to rotate the engagement arm in the first rotational direction to contact the first axial stop to block displacement of the hub, with respect to the wedge plate, in the first axial direction.

According to aspects illustrated herein, there is provided a wedge clutch, including: an axis of rotation; a hub; an outer ring located radially outward of the hub; a wedge plate radially disposed between the hub and the outer ring; and a displacement assembly including a first resilient element urging the hub in a first axial direction, a locking ring including a first axial stop, a slider ring, an engagement arm with a distal end and a second resilient element urging the engagement arm in a first rotational direction with respect to an axis passing through the engagement arm, toward the axis of rotation. To transition from a disconnect mode for the wedge clutch, in which the hub and the outer ring are rotatable with respect to each other, to a connect mode for the wedge clutch, in which the hub and the outer ring are non-rotatably connected: the slider ring is displaceable to move the engagement arm in a second axial direction, opposite the first axial direction; and the second resilient element is arranged to rotate the engagement arm in the first rotational direction to contact the first axial stop with the distal end to block rotation of the hub, with respect to the wedge plate, in the first axial direction. To transition from the connect mode to the disconnect mode: the slider ring is displaceable in the second axial direction to rotate the engagement arm in the second rotational direction; and the first resilient element is arranged to displace the hub in the first axial direction with respect to the wedge plate.

According to aspects illustrated herein, there is provided a wedge clutch, including: an axis of rotation; a shaft; a hub non-rotatably connected to the shaft; an outer ring located radially outward of the hub; a wedge plate radially disposed between the hub and the outer ring; and a displacement assembly including a first resilient element urging the hub in a first axial direction, a locking ring non-rotatably connected to the shaft and including a first axial stop, a slider ring, an engagement arm with a distal end, and a second resilient element urging the engagement arm in a first rotational direction with respect to an axis passing through the engagement arm, toward the axis of rotation. To transition from a disconnect mode for the wedge clutch, in which the hub and the outer ring are rotatable with respect to each other, to a connect mode for the wedge clutch, in which the hub and the outer ring are non-rotatably connected: the slider ring is displaceable to move the engagement arm in a second axial direction, opposite the first axial direction; and the second resilient element is arranged to rotate the engagement arm in the first rotational direction to contact the first axial stop with the distal end to block rotation of the hub, with respect to the wedge plate, in the first axial direction. To transition from the connect mode to the disconnect mode: the slider ring is displaceable in the second axial direction to rotate the engagement arm in the second rotational direction; and the first resilient element is arranged to displace the hub in the first axial direction with respect to the wedge plate.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
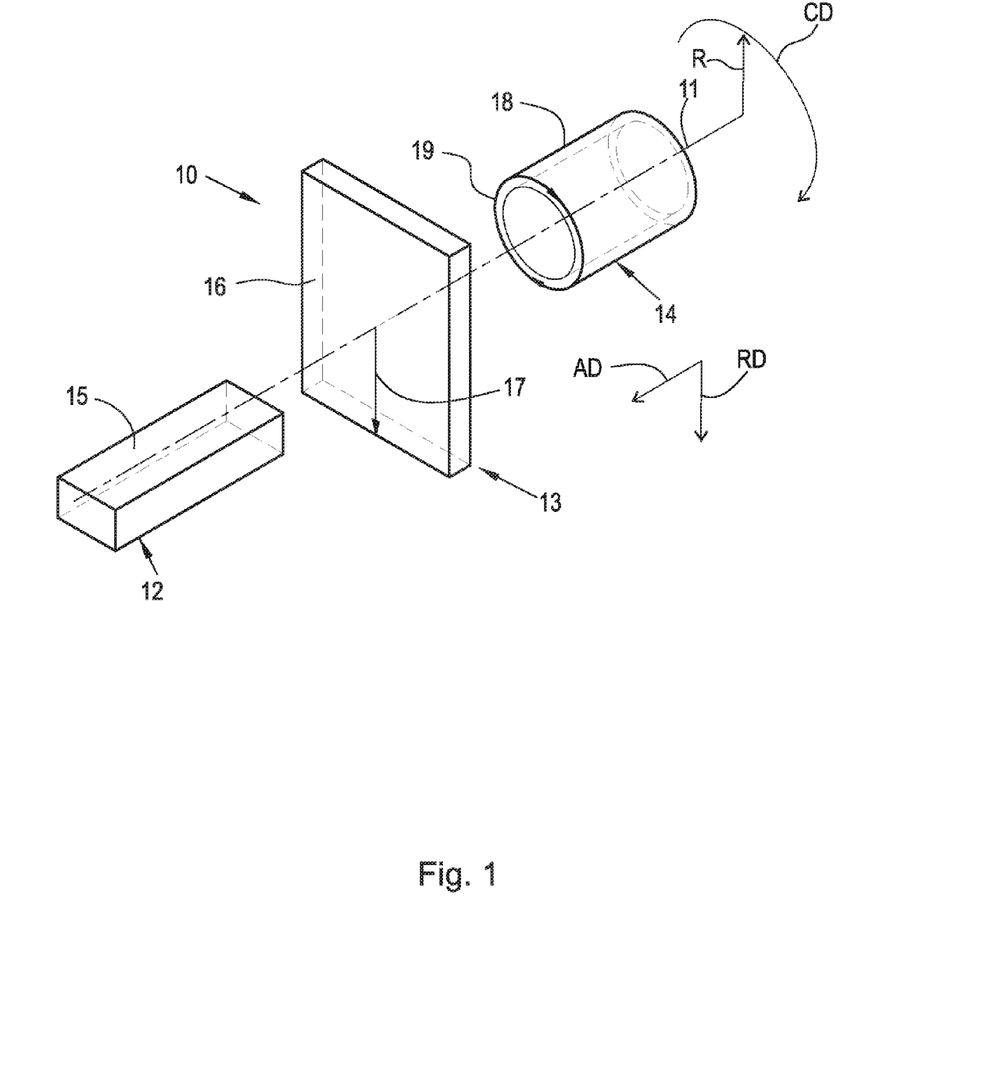
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
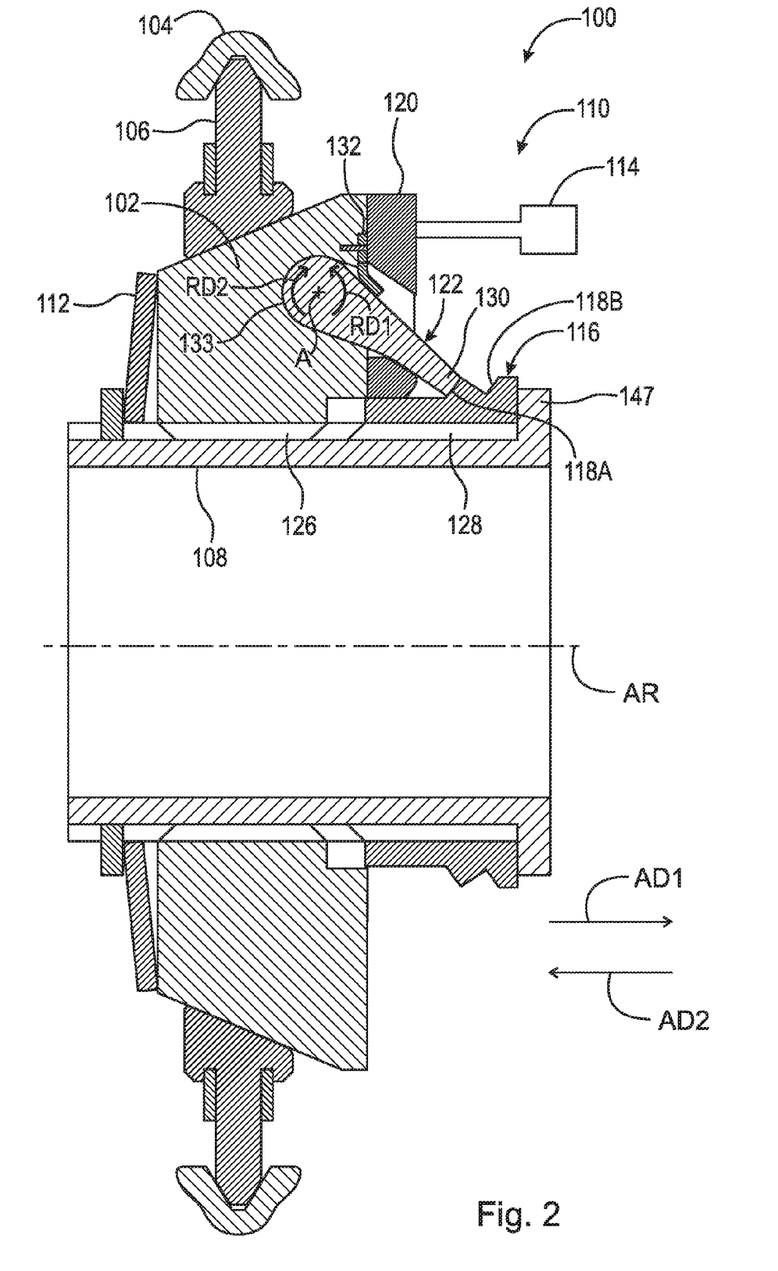
FIG. 2 is a cross-sectional view of a wedge clutch with a self-locking connect mode, in the connect mode.

FIG. 2 is a cross-sectional view of wedge clutch 100 with a self-locking connect mode, in the connect mode. Wedge clutch 100 includes: axis of rotation AR; hub 102; outer ring 104 located radially outward of hub 102; wedge plate 106; splined shaft 108; and displacement assembly 110. Wedge plate 106 is radially disposed between hub 102 and outer ring 104. Assembly 110 includes element 112 urging hub 102 in a axial direction AD1; actuator 114; locking ring 116 including axial stops 118A and 118B; slider ring 120; and engagement arm 122. Hub 102 is non-rotatably connected to shaft 108, for example by splines 126. Hub 102 is axially displaceable along shaft 108 in direction AD1 and direction AD2, opposite direction AD1. Ring 116 is non-rotatably connected to shaft 108, for example by splines 128. Slider ring 120 is located radially outward of at least a portion of ring 116 and, in an example embodiment, slides along ring 116 in axial directions AD1 and AD2. In a disconnect mode, hub 102 and outer ring 104 are rotatable with respect to each other. In the connect mode, hub 102 and outer ring 104 are non-rotatably connected to each other via wedge plate 106. Actuator 114 can be any actuator known in the art, including but not limited to a hydraulic actuator, a mechanical actuator, an electrical actuator or a pneumatic actuator.

Figure 3:
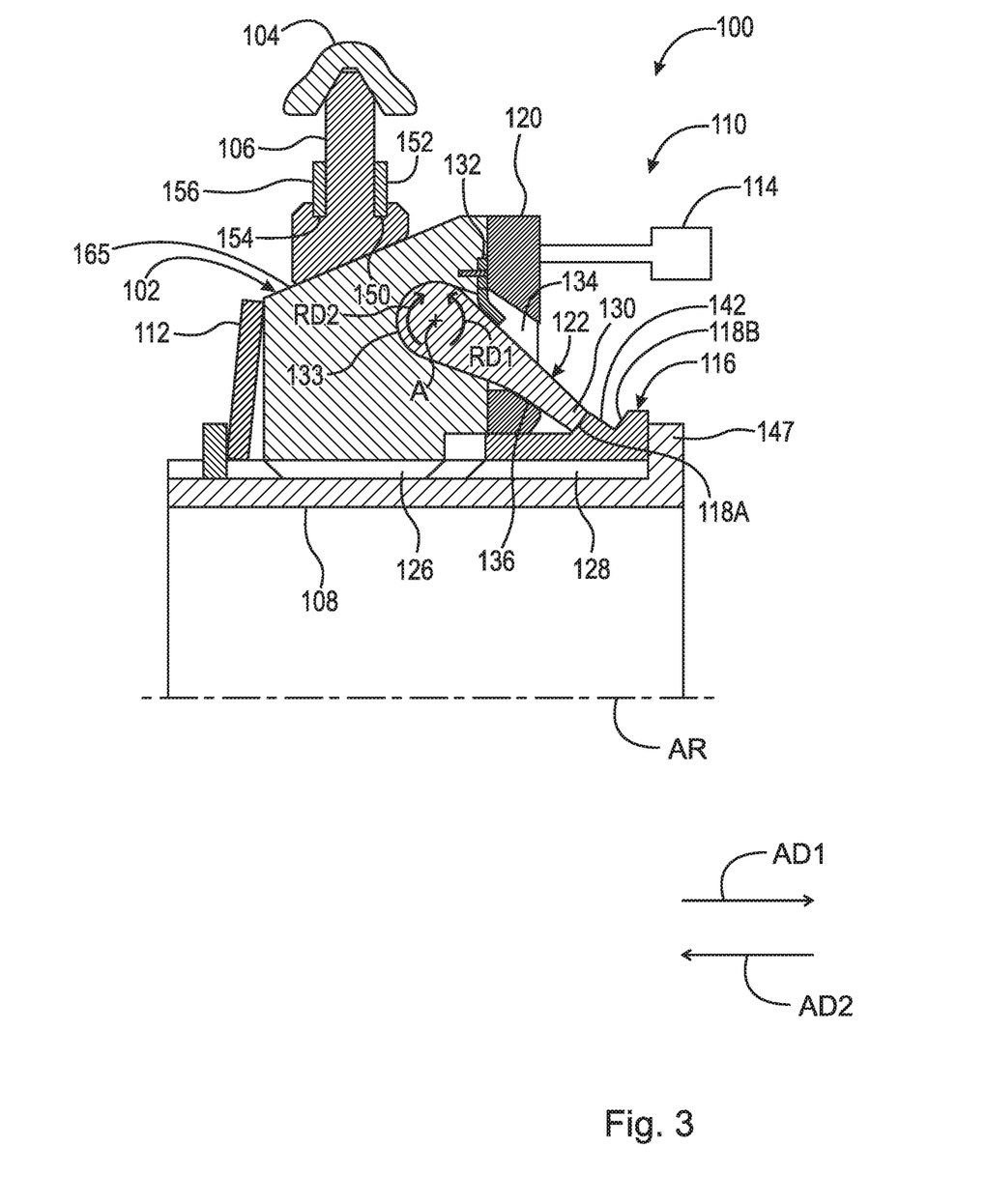
FIG. 3 is a partial cross-sectional view of the wedge clutch in FIG. 2.

FIG. 3 is a partial cross-sectional view of wedge clutch 100 in FIG. 2.

Figure 4:
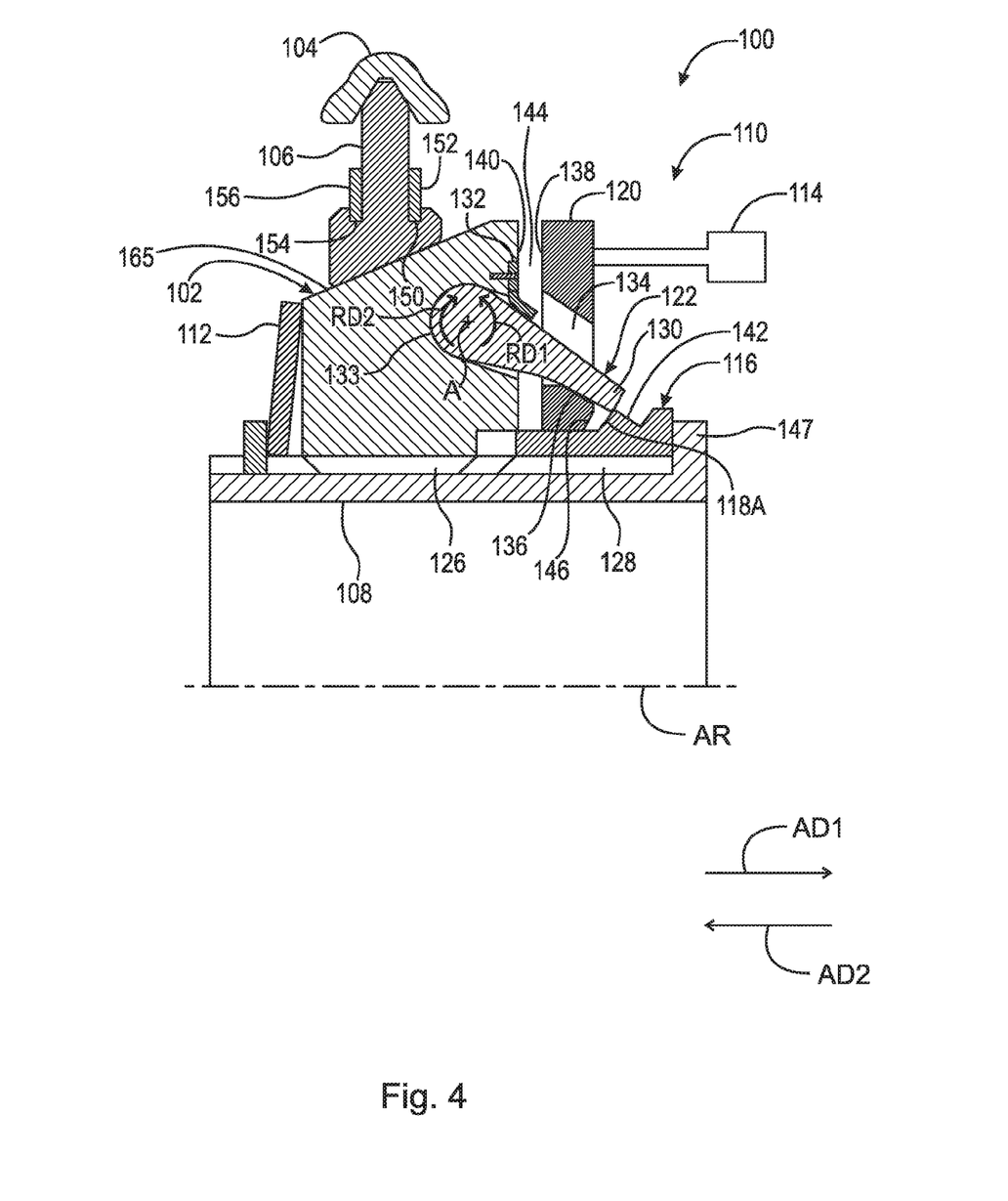
FIG. 4 is a partial cross-sectional view of the wedge clutch in FIG. 2 transitioning from the connect mode to a disconnect mode.

FIG. 4 is a partial cross-sectional view of wedge clutch 100 in FIG. 2 transitioning from the connect mode to a disconnect mode.

Figure 5:
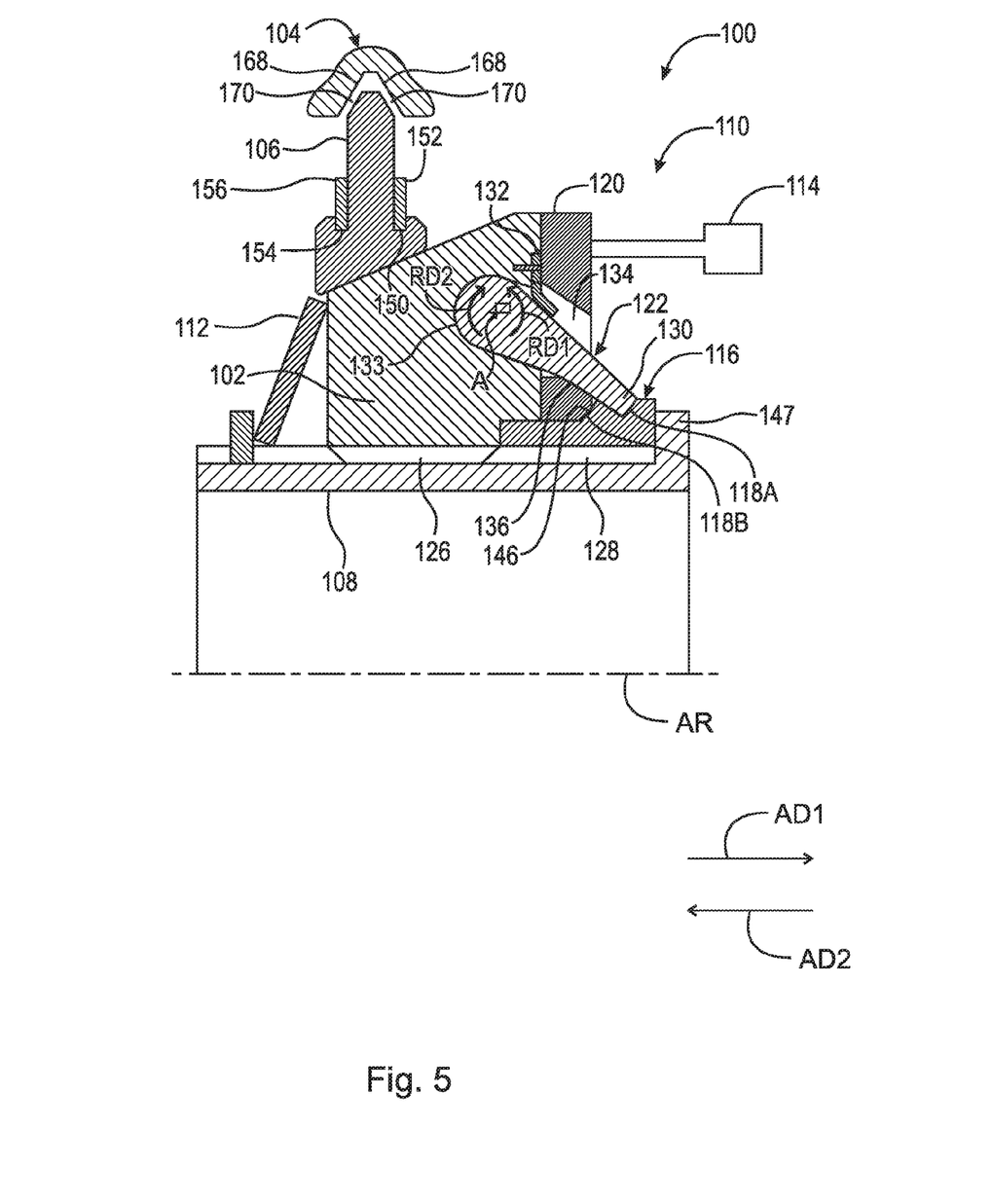
FIG. 5 is a partial cross-sectional view of the wedge clutch in FIG. 2 in the disconnect mode.

FIG. 5 is a partial cross-sectional view of wedge clutch 100 in FIG. 2 in the disconnect mode. The following should be viewed in light of FIGS. 2 through 5. In the connect mode: engagement arm 122 is arranged to contact axial stop 118A and axial stop 118A is arranged to block displacement of hub 102, with respect to wedge plate 106, in axial direction AD1. In the connect mode, contact between engagement arm 122 and locking ring 114, for example stop 118A, is sufficient to block axial displacement of hub 102, with respect to wedge plate 106, in axial direction AD1 without use of actuator 114. Thus, actuator 114 can be deactivated.

Figure 6:
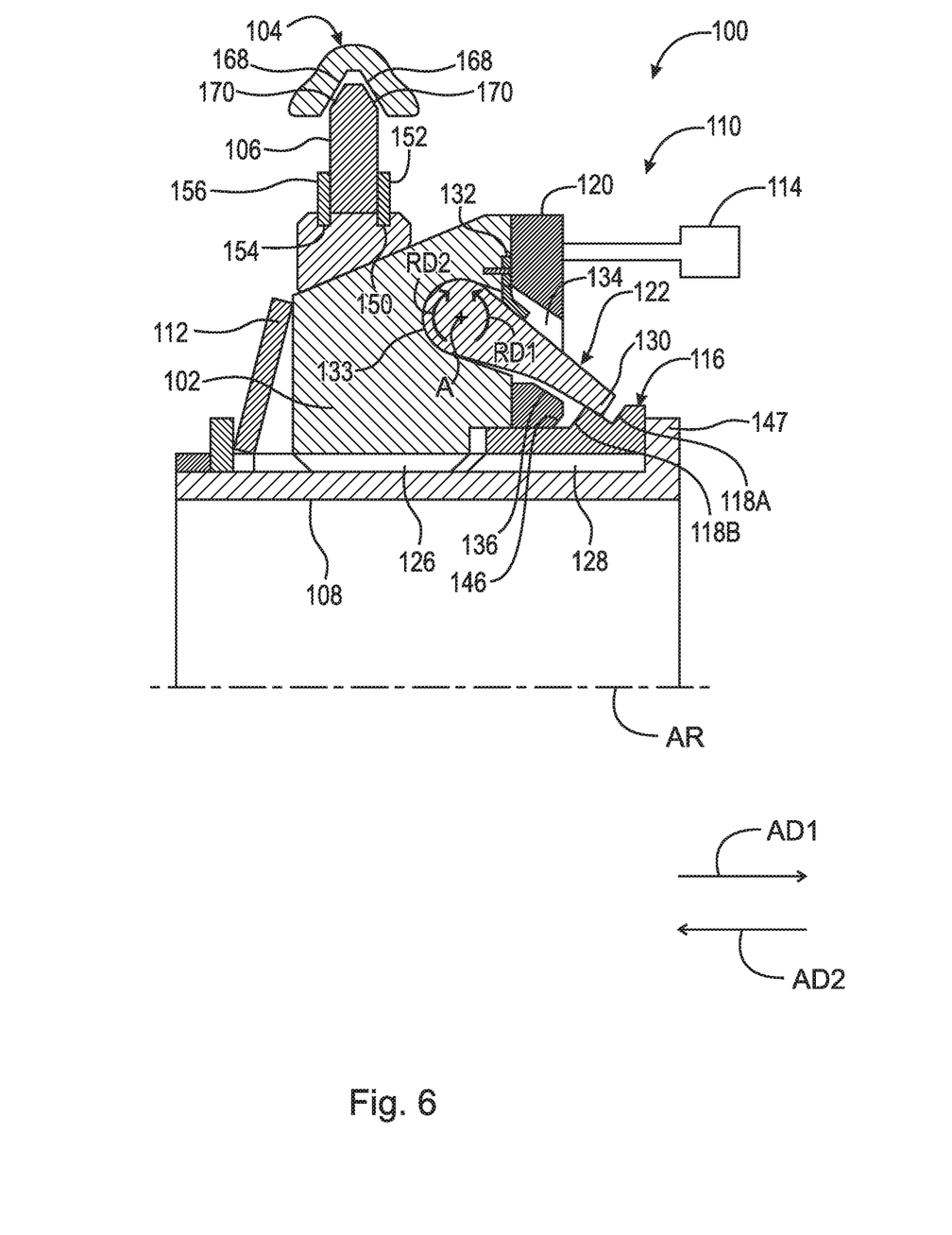
FIG. 6 is a partial cross-sectional view of the wedge clutch in FIG. 2 transitioning from the disconnect mode to a connect mode.

FIG. 6 is a partial cross-sectional view of wedge clutch 100 in FIG. 2 transitioning from the disconnect mode to a connect mode. The following should be viewed in light of FIGS. 2 through 6. To transition from the disconnect mode of FIG. 5 to the connect mode of FIG. 2: actuator 114 is arranged to displace slider ring 120 in axial direction AD2. Slider ring 120 is arranged to displace hub 102, with respect to wedge plate 106, in axial direction AD2. Hub 102 is arranged to displace arm 122 in direction AD2 as shown in FIG. 6 and rotate arm 122 in rotational direction RD1 with respect to axis A passing through arm 122, for example as shown in FIG. 4. To transition from the connect mode to the disconnect mode: actuator 114 is arranged to displace slider ring 120 in axial direction AD1 as shown in FIG. 4 and slider ring 120 is arranged to rotate engagement arm 122 in direction RD1. Element 112 is arranged to displace hub 102, with respect to wedge plate 106, in axial direction AD1.

Engagement arm includes distal end 130. In the connect mode, distal end 130 is arranged to contact axial stop 118A to block displacement of hub 102 axial direction AD1. In the disconnect mode, distal end 130 is arranged to contact axial stop 118B to block displacement of hub 102 in axial direction AD1. As noted above, to transition between the disconnect mode and the connect mode, slider ring 120 is arranged to rotate distal end 130 in a rotational direction RD1, with respect to axis A, away from axis of rotation AR.

In an example embodiment: assembly 110 includes resilient element 132 fixed to hub 102 and engaged with engagement arm 122; and to transition between the disconnect mode and the connect mode, resilient element 132 is arranged to rotate distal end 130 in rotational direction RD2, opposite rotational direction RD1, toward axis of rotation AR. In the connect and disconnect modes, resilient element 132, urges engagement arm 122 in rotational direction RD2. For example, element 132 urges arm 122, for example end 130, into contact with axial stop 118A or 118B and prevents arm 122 from rotating in direction RD1. In an example embodiment, engagement arm 122 is connected to hub 102, for example partially disposed in slot 133 in hub 102, and is rotatable about axis A passing through hub 102.

In an example embodiment, ring 120 includes opening 134 with edge 136, and arm 122 passes through opening 134. To transition from the disconnect mode to the connect mode: actuator 114 is arranged to displace slider ring 120 in axial direction AD2; ring 120 is arranged to displace hub 102 in axial direction AD2, for example by contacting surface 138 of ring 120 with surface 140 of hub 102; and slider ring 120, in particular edge 136, is arranged to contact engagement arm 122 to rotate engagement arm 122 in rotational direction RD1. In an example embodiment: axial stop 118A is located further in axial direction AD1 than axial stop 118B; locking ring 116 includes slope surface 142 sloping radially outward in axial direction AD2 and connecting stops 118A and 118B; and to transition from the disconnect mode to the connect mode, engagement arm 122 is arranged to slide along at least a portion of slope surface 142 in axial direction AD2, as shown in FIG. 6.

To transition from the connect mode to the disconnect mode: actuator 114 is arranged to displace slider ring 120 in axial direction AD1, for example creating axial space 144 separating hub 102 and ring 120; and slider ring 120, in particular edge 136, is arranged to contact engagement arm 122 to rotate engagement arm 122 in rotational direction RD1 as shown in FIG. 4. Once end 130 is rotated radially outward beyond stop 118A, element 112 displaces hub 102 in direction AD1, closing space 144. Element displaces hub 102 and ring 120 until end 130 contacts stop 118B. In an example embodiment, surface 146 of ring 120 contacts stop 118A in the disconnect mode.

Shaft 124 includes radially extending shoulder 147. In the connect and disconnect modes, shoulder 147 blocks displacement of locking ring 116 in axial direction AD1. Further, due to contact between arm 122 and ring 116 in the connect and disconnect modes, shoulder 147 blocks displacement of hub 102 in axial direction AD1.

Figure 7:
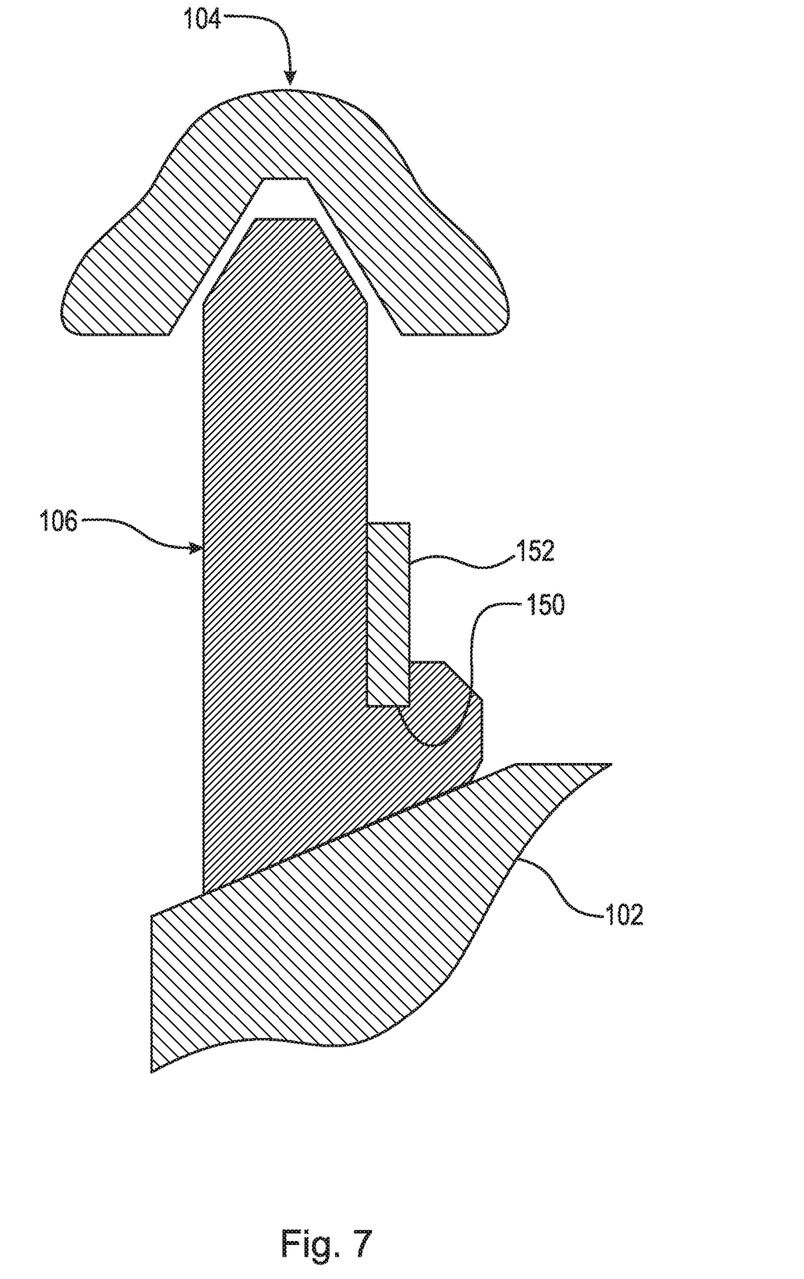
FIG. 7 is a detail of an example embodiment of the wedge plate in FIG. 2.

FIG. 7 is a detail of an example embodiment of the wedge plate in FIG. 2.

Figure 8:
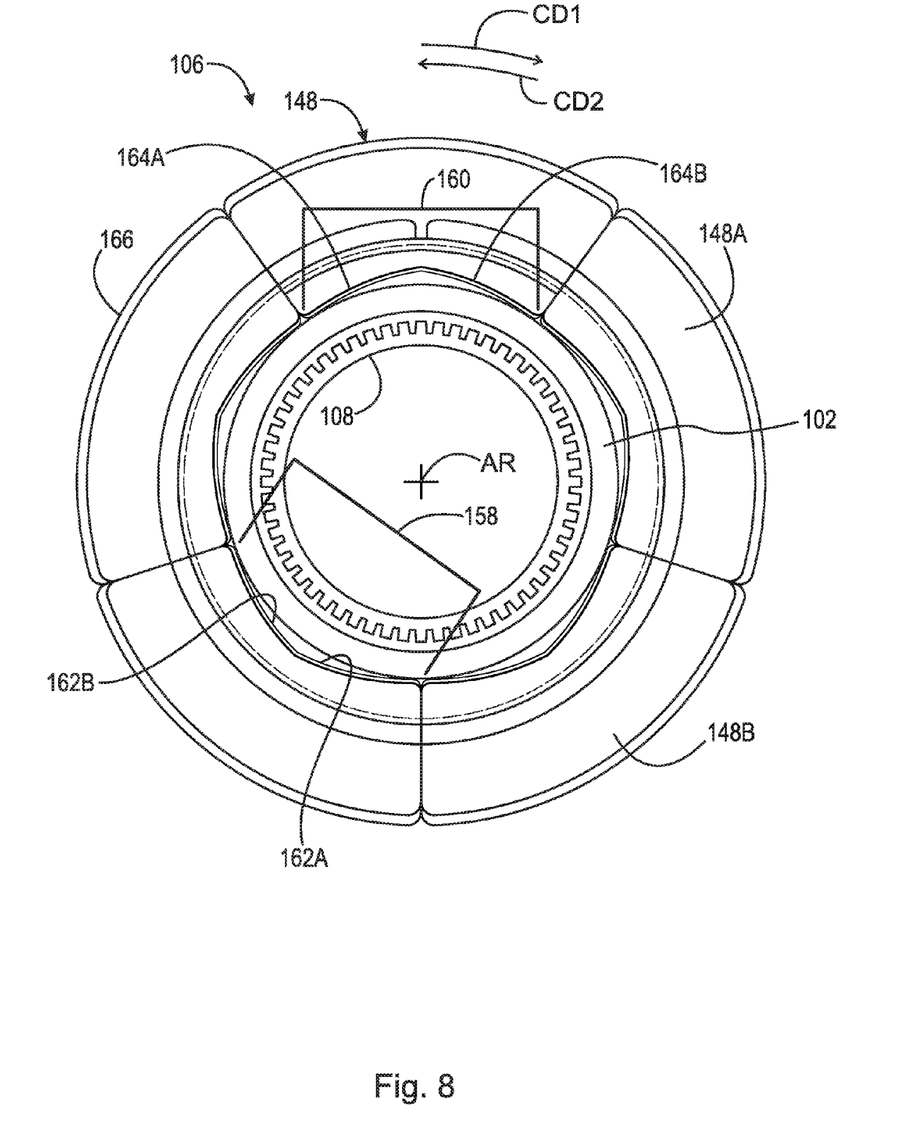
FIG. 8 is a front view of the shaft, hub, and wedge plate shown in FIG. 2; and, FIG. 9 is a back view of the hub and wedge plate shown in FIG. 2.

FIG. 8 is a front view of the shaft, hub, and wedge plate shown in FIG. 2. The following should be viewed in light of FIGS. 2 through 8. In an example embodiment, wedge plate 106 includes segments 148. Each segment 148 is separately formed from the remaining segments 148. That is, each segment 148 is a separate distinct piece. In an example embodiment, each segment 148 includes circumferentially extending grooves 150 and 154 and wedge clutch 100 includes annular resilient elements (rings) 152 and 156 disposed in grooves 150 and 154, respectively, and urging segments 148 radially inward into contact with hub 102. In an example embodiment, each segment 148 includes only one of circumferentially extending grooves 150 and 154 and wedge clutch 100 includes only one of annular resilient elements (rings) 152 and 156 disposed in grooves 150 and 154, respectively. For example, in FIG. 7, plate 106 includes groove 150 and element 152 and not groove 154 and element 156.

In an example embodiment, in the disconnect mode: at least one segment 148 is in contact with a circumferentially adjacent segment 148. In an example embodiment, in the connect mode: at least one segment 148 is free of contact with a circumferentially adjacent segment 148.

In an example embodiment: hub 102 includes ramps, for example, ramp pairs 158; and wedge plate 106 includes ramps, for example ramp pairs 160. Each ramp pair 158 includes ramp 162A extending radially outward in circumferential direction CD1 and ramp 162B extending radially outward in circumferential direction CD2. Each ramp pair 160 includes ramp 164A extending radially outward in circumferential direction CD1 and ramp 164B extending radially outward in circumferential direction CD2. Each ramp 162A is engaged with a respective ramp 164A. Each ramp 162B is engaged with a respective ramp 164B.

The following provides further detail regarding the structure and function of wedge clutch 100. Note that torque can be applied to either hub 102 for transmission to ring 104 or to ring 104 for transmission to hub 102. For example, to transition from the disconnect mode to the connect mode: torque is applied to hub 102 in direction CD1; actuator 114 displaces slider ring 120 in direction AD2; slider ring 120 displaces hub 102 in axial direction AD2. As hub 102 displaces in direction AD2, wedge plate 106 slides radially outwardly along surface 165 of hub 102. Outer circumferential surfaces 166 of segments 148 frictionally engage inner circumferential surface 168 of ring 104. Hub 102 and wedge plate 106 are rotating relative to ring 104 in direction CD1. Therefore, the frictional engagement of plate 106 with ring 104 causes plate 106 to rotate with respect to hub 102, causing ramps 164A to slide radially outwardly (slide up or climb) along ramps 162A, which in turn causes wedge plate 106 to expand radially outward and non-rotatably connect to hub 102 and ring 104.

To transition from the connect mode to the disconnect mode: torque is released from hub 102; actuator 114 displaces slider ring 120 in direction AD1; and element 112 displaces hub 102 in axial direction AD1. Wedge plates 106 slides down surface 165, creating gaps 170. That is, pairs 160 slide down pairs 158. Since there is no contact between wedge plate 106 and ring 104, ring 104 and hub 102 are able to rotate independently of each other.

The discussion for torque applied in direction CD1 is applicable to torque applied in direction CD2. For example, to transition from the disconnect mode to the connect mode: torque is applied to hub 102 in direction CD2; actuator 114 displaces slider ring 120 in direction AD2; slider ring 120 displaces hub 102 in axial direction AD2. As hub 102 displaces in direction AD2, wedge plate 106 slides radially outwardly along surface 165 of hub 102. Outer circumferential surfaces 166 of segments 148 frictionally engage inner circumferential surface 168 of ring 104. Hub 102 and wedge plate 106 are rotating relative to ring 104 in direction CD2. Therefore, the frictional engagement of plate 106 with ring 104 causes plate 106 to rotate with respect to hub 102, causing ramps 164A to slide radially outwardly (slide up or climb) along ramps 162A, which in turn causes wedge plate 106 to expand radially outward and non-rotatably connect to hub 102 and ring 104.

To transition from the connect mode to the disconnect mode: torque is released from hub 102; actuator 114 displaces slider ring 120 in direction AD1; and element 112 displaces hub 102 in axial direction AD1. Wedge plates 106 slides down surface 165, creating gaps 170. That is, pairs 160 slide down pairs 158. Since there is no contact between wedge plate 106 and ring 104, ring 104 and hub 102 are able to rotate independently of each other.

Note that the above discussion regarding application of torque to hub 102 is applicable to application of torque to ring 104.

Figure 9:
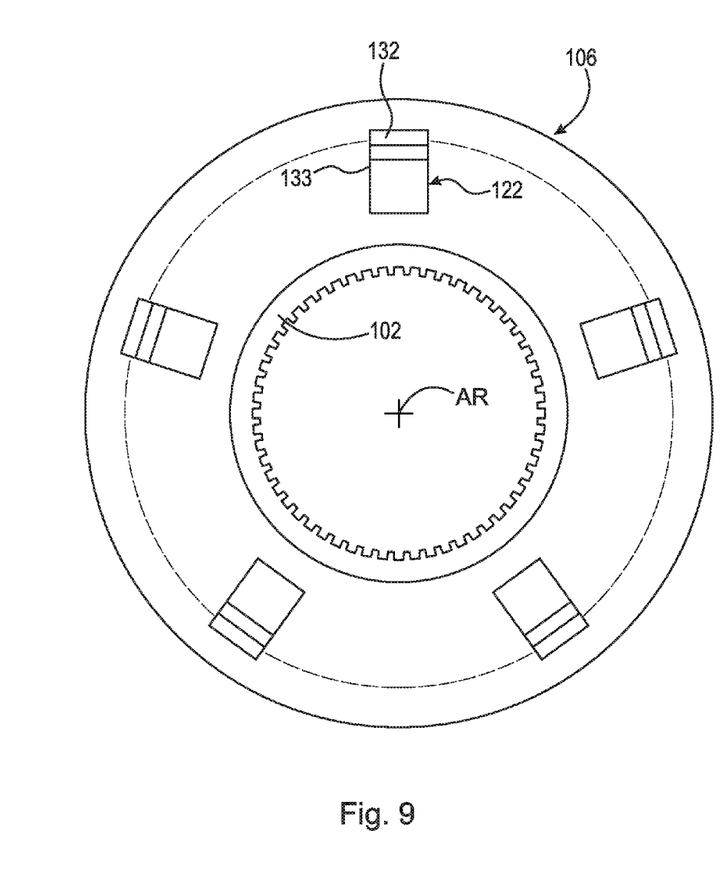

FIG. 9 is a back view of the hub and wedge plate shown in FIG. 2. The following should be viewed in light of FIGS. 2 through 9. In an example embodiment: wedge clutch 100 includes a plurality of arms 122 disposed in respective slots 133 in hub 102; and a plurality of elements 132 engaged with respective arms 122. Ring 120 includes a plurality of openings 134 through which respective arms 122 extend. Ring 116 includes a pluralities of pairs of stops 118A and 118B, or each of stops 118A and 118B extends circumferentially to be engagable with the plurality of arms 122. Each pair of stops 118A and 118B is engageable with a respective arm 122. It should be understood that clutch 100 is not limited to any particular number of arms 122, slots 133, openings 134 or pairs of stops 118A and 118B. Multiple arms 122 circumferentially equalize axial forces in play during operation of clutch 100.

Advantageously, wedge clutch 100 resolves the problem noted above of preventing a wedge clutch from slipping from a connect mode to a disconnect mode or of preventing a wedge clutch from slipping in the connect mode to reduce the torque-carrying capacity of the clutch. In particular, contact between arm 122 and ring 116, for example stop 118A, and the axially fixing of ring 116, for example by contact between ring 116 and shoulder 147, prevents displacement of hub 102, with respect to plate 106, in direction AD1 during the connect mode. Preventing hub 102 from displacing in direction AD1, in particular with respect to wedge plate 106, in the connect mode eliminates undesired opening of clutch 100 and loss of torque-carrying capacity for clutch 100. Further, in the connect mode, actuator 114 can be deactivated, decreasing the energy budget for actuator 114 and wedge clutch 100. That is, the force applied by element 112 to arm 122 and distal end 130, via hub 102, wedges arm 122 into contact with stop 118A, preventing further displacement of hub 102 in direction AD1 and eliminating the need to use actuator 114 to block further displacement of hub 102 in direction AD1.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A wedge clutch, comprising:
   an axis of rotation, defining a first and second axial direction;
   a hub;
   an outer ring located radially outward of the hub;
   a wedge plate radially disposed between the hub and the outer ring; and, a displacement assembly including:
   a locking ring including a first axial stop;
   an engagement arm;
   a first resilient element urging the engagement arm in a first rotational direction, with respect to a first axis passing through the engagement arm, toward the axis of rotation; and,
   a slider ring axially displaceable along the axis of rotation to:
   rotate the engagement arm in a second rotational direction, opposite the first rotational direction, to transition from a connect mode for the wedge clutch, in which the hub and the outer ring are non-rotatably connected, to a disconnect mode for the wedge clutch, in which the hub and the outer ring are rotatable with respect to each other; and,
   for the connect mode, enable the first resilient element to rotate the engagement arm in the first rotational direction to contact the first axial stop to block displacement of the hub, with respect to the wedge plate, in the first axial direction.

2. The wedge clutch of claim 1, wherein the slider ring is axially displaceable:
   in the first axial direction to rotate the engagement arm in the second rotational direction; and,
   in the second axial direction to enable the first resilient element to rotate the engagement arm in the first rotational direction to contact the first axial stop.

3. The wedge clutch of claim 1, wherein:
   the engagement arm includes a distal end; and,
   to transition from the connect mode to the disconnect mode, the slider ring is displaceable in the first axial direction to rotate the engagement arm in the second rotational direction to disconnect the distal end from the first axial stop.

4. The wedge clutch of claim 1, wherein:
   the engagement arm includes a distal end;
   the locking ring includes a second axial stop;
   the displacement assembly includes a first element; and,
   to transition from the connect mode to the disconnect mode:
   the first element is arranged to displace the engagement arm in the first axial direction; and,
   the first resilient element is arranged to rotate the engagement arm in the first rotational direction to contact the distal end with the second axial stop to block displacement of the hub in the first axial direction.

5. The wedge clutch of claim 1, wherein:
   the engagement arm is connected to the hub; and,
   the first axis passes through the hub.

6. The wedge clutch of claim 1, further comprising:
   a shaft, wherein:
   the hub is non-rotatably connected to the shaft and axially displaceable along the shaft; and,
   the locking ring is non-rotatably connected to the shaft.

7. The wedge clutch of claim 6, wherein:
   the shaft includes a radially extending shoulder; and,
   in the connect and disconnect modes, the shoulder blocks displacement of the locking ring in the first axial direction.

8. The wedge clutch of claim 1, further comprising:
   an actuator, wherein to transition from the disconnect mode to the connect mode the actuator is arranged to displace the slider ring in the second axial direction.

9. The wedge clutch of claim 1, further comprising:
   an actuator, wherein to transition from the connect mode to the disconnect mode, the actuator is arranged to displace the slider ring in the first axial direction.

10. The wedge clutch of claim 1, wherein:
    the locking ring includes a second axial stop;
    the first axial stop is located further in the second axial direction than the second axial stop;

the locking ring includes a slope surface sloping radially outward in the second axial direction and connecting the first and second axial stops; and, to transition from the disconnect mode to the connect mode, the engagement arm is arranged to slide along at least a portion of the slope surface in the second axial direction.

11. The wedge clutch of claim 1, wherein a portion of the first resilient element is radially fixed with respect to the hub.

12. The wedge clutch of claim 1, wherein:
the slider ring includes an axial opening bordered by a first edge;
the engagement arm passes through the axial opening; and,
to displace between the connect and disconnect modes, the first edge is arranged slide along the engagement arm to rotate the engagement arm in the second rotational direction.

13. The wedge clutch of claim 1, wherein in the connect mode, contact between the engagement arm and the first axial stop is sufficient by itself to block axial displacement of the hub, with respect to the wedge plate, in the first axial direction.

14. The wedge clutch of claim 1, wherein:
in the connect and disconnect modes, the slider ring is in contact with the hub; and,
during the transition between the connect and disconnect modes, the slider ring is separated, in the first axial direction, from the hub by an axial space.

15. The wedge clutch of claim 1, wherein the displacement assembly includes a second resilient element urging the hub in the first axial direction.

16. The wedge clutch of claim 1, wherein:
the wedge plate includes a plurality of segments, each segment in the plurality of segments separately formed from remaining segments in the plurality of segments;
each segment in the plurality of segments includes a respective circumferentially extending groove, the wedge clutch further comprising:
an annular resilient element disposed in the respective circumferentially extending grooves and urging the plurality of segments radially inward.

17. The wedge clutch of claim 16, wherein:
each segment in the plurality of segments includes a respective first plurality of ramps;
the hub includes a second plurality of ramps engaged with the respective first pluralities of ramps; and,
to transition from the disconnect mode to the connect mode, the respective first pluralities of ramps are arranged to slide radially outwardly along the second plurality of ramps, in a first circumferential direction.

18. A wedge clutch, comprising:
an axis of rotation defining a first and second axial direction;
a hub;
an outer ring located radially outward of the hub;
a wedge plate radially disposed between the hub and the outer ring; and,
a displacement assembly including:
a first resilient element urging the hub in the first axial direction;
a locking ring including a first axial stop;
a slider ring;
an engagement arm; and,
a second resilient element urging the engagement arm in a first rotational direction, with respect to an axis passing through the engagement arm, toward the axis of rotation, wherein: to transition from a disconnect mode for the wedge clutch, in which the hub and the outer ring are rotatable with respect to each other, to a connect mode for the wedge clutch, in which the hub and the outer ring are non-rotatably connected:
the slider ring is displaceable to move the engagement arm in the second axial direction, opposite the first axial direction; and,
the second resilient element is arranged to rotate the engagement arm in the first rotational direction to contact the first axial stop with the engagement arm to block displacement of the hub, with respect to the wedge plate, in the first axial direction; and,
to transition from the connect mode to the disconnect mode;
the slider ring is displaceable in the first axial direction to rotate the engagement arm in the second rotational direction; and,
the first resilient element is arranged to displace the hub in the first axial direction with respect to the wedge plate.

19. The wedge clutch of claim 18, further comprising:
a shaft, wherein:
the hub and the locking ring are non-rotatably connected to the shaft; and,
the hub is axially displaceable along the shaft.

20. A wedge clutch, comprising:
an axis of rotation defining a first and second axial direction;
a shaft;
a hub non-rotatably connected to the shaft;
an outer ring located radially outward of the hub;
a wedge plate radially disposed between the hub and the outer ring; and,
a displacement assembly including:
a first resilient element urging the hub in the first axial direction;
a locking ring non-rotatably connected to the shaft and including a first axial stop;
a slider ring;
an engagement arm with a distal end; and,
a second resilient element urging the engagement arm in a first rotational direction with respect to an axis passing through the engagement arm, toward the axis of rotation, wherein: to transition from a disconnect mode for the wedge clutch, in which the hub and the outer ring are rotatable with respect to each other, to a connect mode for the wedge clutch, in which the hub and the outer ring are non-rotatably connected;
the slider ring is displaceable to move the engagement arm in the second axial direction, opposite the first axial direction; and,
the second resilient element is arranged to rotate the engagement arm in the first rotational direction to contact the first axial stop with the distal end to block displacement of the hub, with respect to the wedge plate, in the first axial direction; and,
to transition from the connect mode to the disconnect mode:
the slider ring is displaceable in the first axial direction to rotate the engagement arm in the second rotational direction; and,
the first resilient element is arranged to displace the hub in the first axial direction with respect to the wedge plate.

* * * * *